(12) United States Patent (10) Patent No.: US 11,711,499 B2
Chen et al. (45) Date of Patent: Jul. 25, 2023

(54) PROJECTION SYSTEM AND PROJECTION METHOD

(71) Applicant: Coretronic Corporation, Hsin-Chu (TW)

(72) Inventors: Shun-Tai Chen, Hsin-Chu (TW); Chen Hsiang Shih, Hsin-Chu (TW); Chen-Yi Hong, Hsin-Chu (TW); Yu-Sheng Lee, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 0 days.

(21) Appl. No.: 17/204,888

(22) Filed: Mar. 17, 2021

(65) Prior Publication Data

US 2021/0297642 A1 Sep. 23, 2021

(30) Foreign Application Priority Data

Mar. 20, 2020 (CN) .......................... 202010199275.8

(51) Int. Cl.
*H04N 9/31* (2006.01)
*G03B 21/26* (2006.01)
(Continued)

(52) U.S. Cl.
CPC .......... *H04N 9/3179* (2013.01); *G03B 21/142* (2013.01); *G03B 21/2053* (2013.01); *G03B 21/26* (2013.01)

(58) Field of Classification Search
CPC ........... H04N 21/482; H04N 21/42204; H04N 21/42206; H04N 21/637; H04N 21/6377;
(Continued)

(56) References Cited

U.S. PATENT DOCUMENTS

2003/0117532 A1* 6/2003 Karasawa ........ H04N 21/42204
348/E7.086
2005/0008345 A1* 1/2005 Choi .................. H04N 21/4122
348/E5.002
(Continued)

FOREIGN PATENT DOCUMENTS

| CN | 101790032 | 7/2010 |
|---|---|---|
| CN | 101989245 | 3/2011 |
| JP | 2017090662 | 5/2017 |

OTHER PUBLICATIONS

"Office Action of China Counterpart Application", dated Jan. 19, 2023, p. 1-p. 6.

*Primary Examiner* — John W Miller
*Assistant Examiner* — Humam M Satti
(74) *Attorney, Agent, or Firm* — JCIPRNET

(57) ABSTRACT

A projection system and a projection method are provided. The projection system includes a projection device, a streaming device, and a control device. The projection device includes a first image input port and a second image input port. The streaming device is electrically connected to the first image input port of the projection device and is coupled to the projection device in a detachable manner. The control device is communicatively connected to the streaming device. The control device transmits a first command signal to the streaming device, so that the projection device projects image data from the streaming device. The projection method may be executed by the projection system. The projection system and the projection method of the disclosure provide a user with more convenient operation environment and operation interface.

11 Claims, 3 Drawing Sheets

(51) Int. Cl.
    *G03B 21/20*      (2006.01)
    *G03B 21/14*      (2006.01)
(58) Field of Classification Search
    CPC . H04N 21/658–6587; H04N 21/43072; H04N
              21/4622; H04N 9/3179; H04N 21/4436;
              H04N 9/3102; H04N 21/4122; H04N
              21/43635; H04N 9/3141; H04N 5/765;
              G03B 21/142; G03B 21/2053; G03B
                            21/26; G03B 21/12
    See application file for complete search history.

(56)              References Cited

U.S. PATENT DOCUMENTS

| | | | |
|---|---|---|---|
| 2009/0044221 A1* | 2/2009 | Fukui | H04N 21/485 |
| | | | 725/38 |
| 2009/0054003 A1* | 2/2009 | Lee | H04N 21/43615 |
| | | | 455/68 |
| 2009/0245803 A1* | 10/2009 | Garner | H04N 21/42204 |
| | | | 398/106 |
| 2013/0057774 A1* | 3/2013 | Yoshida | H04N 21/4122 |
| | | | 345/207 |
| 2014/0092312 A1* | 4/2014 | Furihata | H04N 5/268 |
| | | | 348/706 |
| 2017/0366975 A1* | 12/2017 | Kamimura | G09G 5/12 |
| 2018/0088768 A1* | 3/2018 | Nakagawa | G03B 21/2053 |
| 2018/0103211 A1* | 4/2018 | Marino | G08C 17/00 |
| 2018/0316876 A1 | 11/2018 | Gopinath et al. | |
| 2020/0014974 A1* | 1/2020 | Patel | H04N 21/43615 |
| 2020/0059627 A1* | 2/2020 | Sano | H04N 21/4424 |
| 2021/0021904 A1* | 1/2021 | Kim | H04N 21/42204 |
| 2021/0219118 A1* | 7/2021 | Chen | H04N 21/4436 |

* cited by examiner

PROJECTION SYSTEM AND PROJECTION METHOD

CROSS-REFERENCE TO RELATED APPLICATION

This application claims the priority benefit of China application serial no. 202010199275.8, filed on Mar. 20, 2020. The entirety of the above-mentioned patent application is hereby incorporated by reference herein and made a part of this specification.

BACKGROUND

Technical Field

The disclosure relates to an imaging system and an imaging method, and in particular, to a projection system including a streaming device and a projection method.

Description of Related Art

In some projection systems, when a user is to display image data from a streaming device through a projection device, in addition to using a control device (e.g., remote controller) of the projection device to select the image input port of the projection device corresponding to the streaming device, the user also needs to use a control device (e.g., another remote controller) of the streaming device to select the image data from the streaming device. Such operation of the control devices is inconvenient, and the operation steps are complicated and often cause inconvenience to the user. In some projection systems, an integrated control device (e.g., integrated remote controller) may be used to control the projection device and the streaming device. However, before using such an integrated control device, the user needs to perform a pairing process, so that the integrated control device is linked or paired with the projection device and with the streaming device, which is a cumbersome process.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection system and a projection method, which can control a projection device through a streaming device to improve the operation of a user.

An embodiment of the disclosure provides a projection system including a projection device, a streaming device, and a control device. The projection device includes a first image input port and a second image input port. The streaming device is electrically connected to the first image input port of the projection device and is coupled to the projection device in a detachable manner. The control device is communicatively connected to the streaming device. The control device transmits a first command signal to the streaming device, so that the projection device projects image data from the streaming device.

An embodiment of the disclosure provides a projection method including transmitting, by a control device, a first command signal to a streaming device, so that a projection device projects image data from the streaming device. The projection device includes a first image input port and a second image input port, and the streaming device is electrically connected to the first image input port of the projection device. The control device is communicatively connected to the streaming device. The projection method further includes transmitting, by the control device, a second command signal to the streaming device, so that the projection device projects image data transmitted via the second image input port.

Based on the above, with the projection system and the projection method of the embodiments of the disclosure, the user can use the control device to control the streaming device and the projection device, and the pairing processes between the control device and the projection device and between the control device and the streaming device can be omitted. The projection system and the projection method of the embodiments of the disclosure can provide the user with more convenient operation environment and operation interface to thereby effectively improve the operation convenience for the user.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting.

Figure 1:
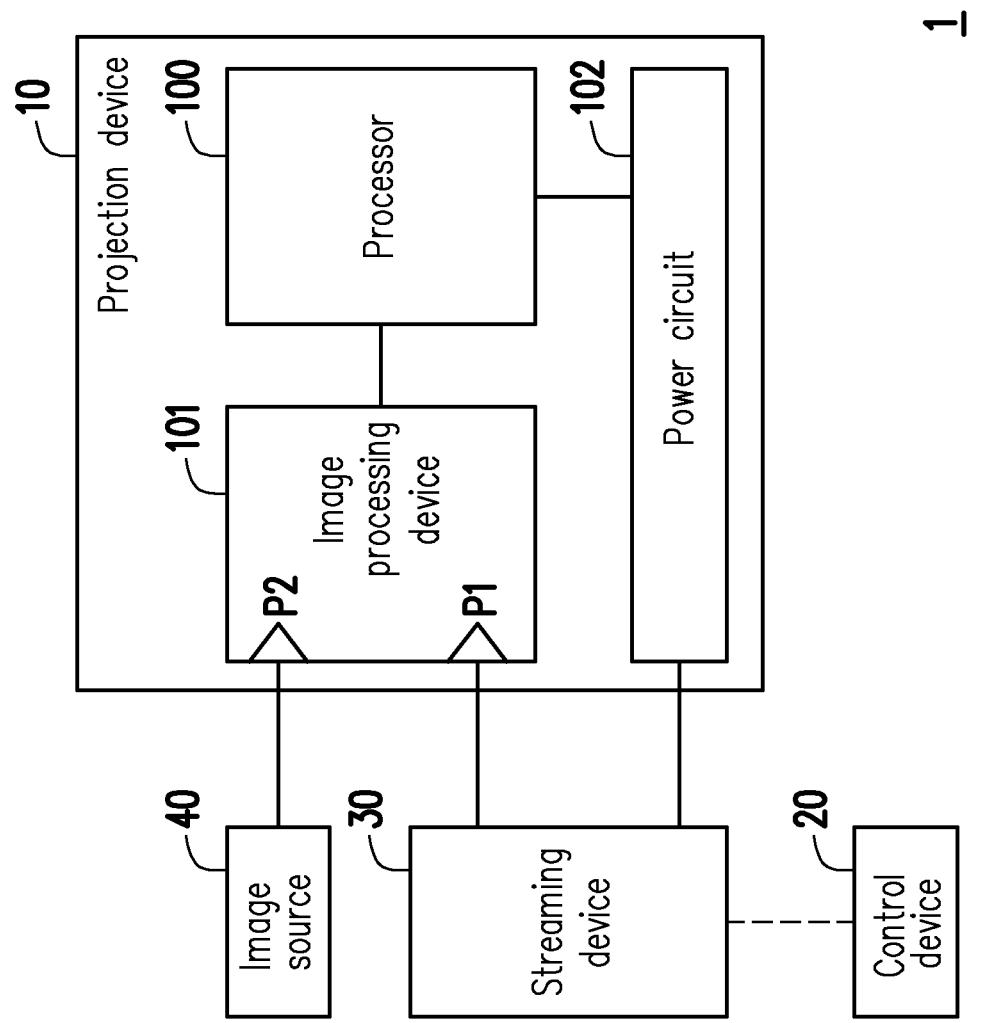
FIG. 1 is a schematic view showing a projection system according to an embodiment of the disclosure.

Referring to FIG. 1, FIG. 1 is a schematic view showing a projection system 1 according to an embodiment of the disclosure. In some embodiments, the projection system 1 includes a projection device 10, a control device 20, and a streaming device 30. The projection device 10 may include a first image input port P1 and a second image input port P2. In this embodiment, the streaming device 30 is electrically connected to the first image input port P1 of the projection device 10, and the streaming device 30 is coupled to the projection device 10 in a detachable manner. In some embodiments, the projection system 1 may further include an image source 40. The image source 40 may be electrically connected to the second image input port P2 of the projection device 10. As shown in FIG. 1, the control device 20 may be communicatively connected to the streaming device 30 to control the streaming device 30 and further control the projection device 10. In the projection system 1, the projection device 10 may project image data from the streaming device 30 or the image source 40. The projection device 10 is, for example, a projector. A user may use the control device 20 to operate the streaming device 30, so that the projection device 10 can project the image data from the streaming device 30. Specifically, when the projection device 10 projects the image data from the image source 40, the user may use the control device 20 to switch the projection device 10 to project the image data from the streaming device 30.

Specifically, the projection device 10 may include a processor 100, an image processing circuit 101, and a power circuit 102. The image processing circuit 101 is connected to the first image input port P1 and the second image input port P2, and the processor 100 is coupled to the image processing circuit 101. The processor 100 may control the overall operation of the projection device 10. Through the first image input port P1 and the second image input port P2, the image processing circuit 101 can receive image data respectively transmitted by the streaming device 30 and the image source 40 to perform selective projection. The processor 100 performs image processing on the received image data, or scales the received image data to better satisfy the projector specification or user requirements. The power circuit 102 may be coupled to the processor 100 and the streaming device 30 and may supply power to the projection device 10 and the streaming device 30. In some embodiments, the power circuit 102 includes a low voltage power supply (LVPS).

In some embodiments, for example, the processor 100 may include a central processing unit (CPU), another programmable general-purpose or specific-purpose micro control unit (MCU), microprocessor, digital signal processor (DSP), programmable controller, application specific integrated circuit (ASIC), arithmetic logic unit (ALU), complex programmable logic device (CPLD), field programmable gate array (FPGA), another similar device, or a combination of the above devices. The image processing circuit 101 may be a scaler, a graphics processing unit (GPU), another similar device, or a combination of the above devices. The above examples are only intended to illustrate the disclosure and are not intended to limit the scope of the disclosure.

In some embodiments, the projection device 10 may further include a light source, a light valve, and a projection lens (not shown). The light source may provide an illumination beam, the light valve may convert the illumination beam into an image beam, and the projection lens may project the image beam outward to form an image on a projection target such as a screen, but the disclosure is not limited thereto.

In some embodiments, for example, the control device 20 may include a remote controller, a smartphone, a tablet computer, a notebook computer, a personal digital assistant, a portable electronic device, another similar device, or a combination of the above devices. Further, the control device 20 may include a power key and a function key, and the control device 20 may perform signal transmission via at least two transmission methods. The control device 20 may be communicatively connected with the streaming device 30 via wireless communication. For example, the control device 20 may be communicatively connected with the streaming device 30 via a Wireless Fidelity (WiFi) communication interface, a Bluetooth communication interface, an Infrared Radiation (IR) communication interface, a ZigBee communication interface, and/or other wireless communication interfaces. In other embodiments, the control device 20 may further include a volume key (a volume up key and a volume down key), a return key, etc. The various keys of the control device 20 may be integrated with at least two transmission methods.

In some embodiments, the streaming device 30 may provide a multimedia interface for the user to select image data. For example, the streaming device 30 may be a device which includes a dongle. The dongle may be an externally connected device, and the projection device 10 may be connected to specific audio-visual websites by using the dongle to thereby provide a multimedia interface for the user to select image data. In some embodiments, according to the operation of the control device 20, the streaming device 30 may obtain image data from the network for the user to watch.

In some embodiments, the streaming device 30 and the projection device 10 may be connected to each other via the High Definition Multimedia Interface (HDMI). In this embodiment, the first image input port P1 and/or the second image input port P2 may include an HDMI connector. In a further embodiment, the operation in which the streaming device 30 controls the projection device 10 may be performed through Consumer Electronics Control (CEC), Digital Display Channel (DDC), or Command Interface (CI) in the HDMI, so that the streaming device 30 and the projection device 10 can be communicatively connected to transmit a command signal or a control signal, for example. However, the disclosure is not limited thereto. In other embodiments, the streaming device 30 may also be connected to a local area network or the Internet via wired communication, and the wired communication interface may include a local area network (LAN) interface, a Universal Serial Bus (USB) interface, and/or other wired communication interfaces.

In some embodiments, the image source 40 may also provide image data for the projection device 10 to play. The image source 40 may transmit the image signal to the projection device 10 via wired transmission or wireless transmission, which is not specifically limited herein. For example, the image source 40 may include a cable TV, a wireless TV, a network signal, a specific audio-visual website, or a streaming audio-visual website to provide the user with image data to watch.

In a further embodiment (not shown), the projection device 10 and the streaming device 30 may be integrated according to different design concepts and user requirements. For example, the streaming device 30 may be integrated into the main body of the projection device 10. Further, the projection device 10 and the streaming device 30 may be configured to be separable. Alternatively, the power circuit 102 of the projection device 10 may be coupled to the streaming device 30 and supply power to the streaming device 30. Specifically, according to the control command of the control device 20, the processor 100 of the projection device 10 may control the power circuit 102 to provide a predetermined voltage (e.g., 5 V) to the streaming device 30 to turn on the streaming device 30.

Figure 2:
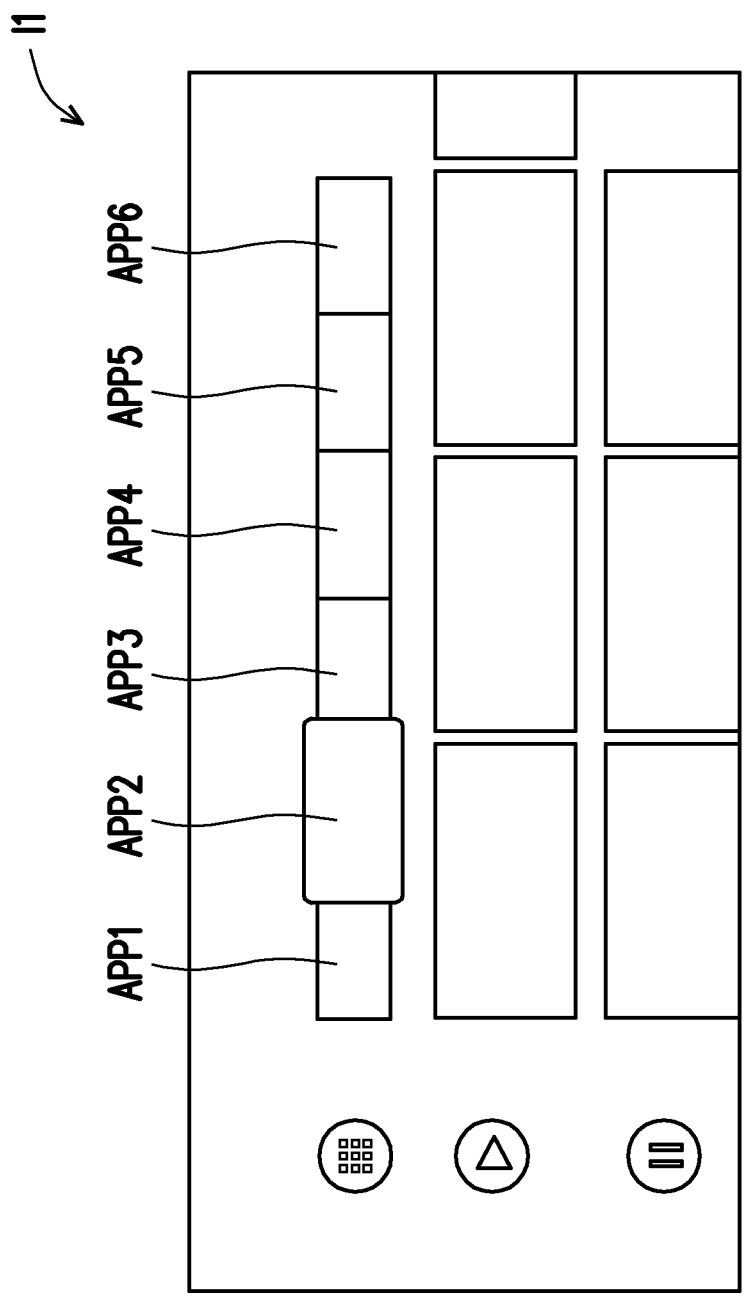
FIG. 2 is a schematic view showing a multimedia interface displayed by the streaming device according to an embodiment of the disclosure.

Referring to FIG. 2, FIG. 2 is a schematic view showing a multimedia interface I1 displayed by the streaming device 30 according to an embodiment of the disclosure. In FIG. 2, the projection device 10 may display or project the multimedia interface I1. However, the disclosure is not limited thereto. In other embodiments, the multimedia interface I1 may also be displayed by the streaming device 30. In that case, the multimedia interface I1 may be built in the streaming device. The multimedia interface I1 may include multiple blocks. These blocks may correspond to different functions for the control device 20 to select. For example, the multimedia interface I1 may include multiple image interfaces APP1 to APP6. When the streaming device 30 receives a command signal of the control device 20 selecting one of the image interfaces APP1 to APP6, the streaming device 30 performs the corresponding operation function of the image interfaces APP1 to APP6 accordingly. In an embodiment, the control device 20 may select one of the image interfaces APP1 to APP6 to connect to a specific image channel. In an embodiment, the control device 20 may select one of the image interfaces APP1 to APP6 to control the projection or display content of the projection device 10.

Figure 3:
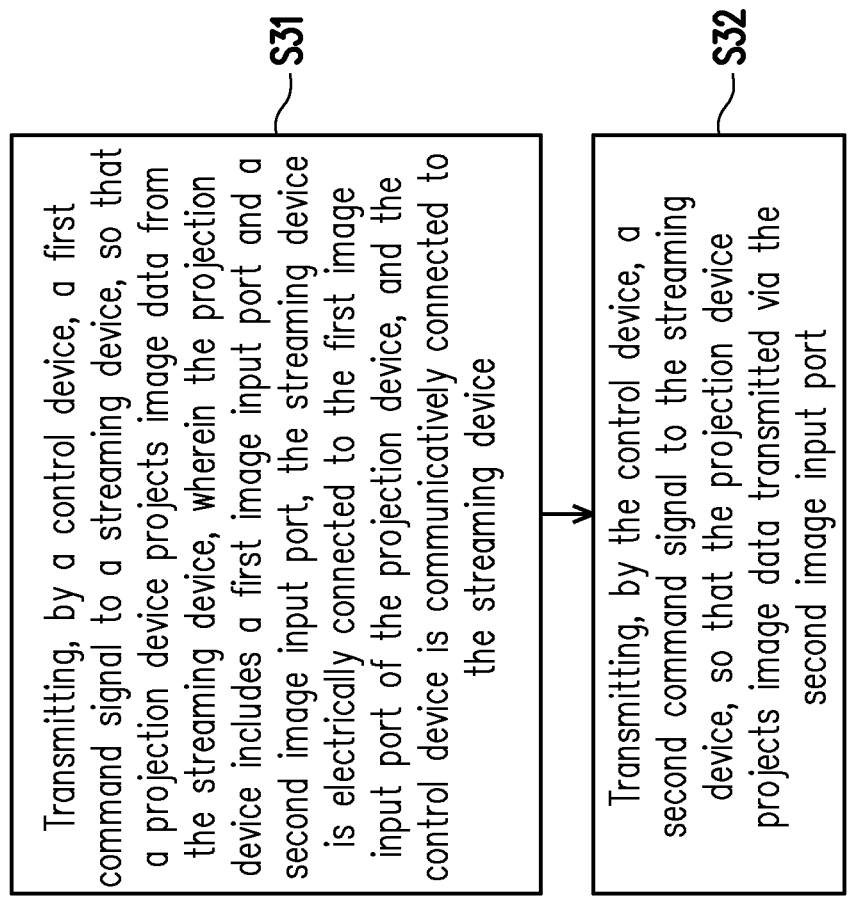
FIG. 3 is a schematic view showing a projection method according to an embodiment of the disclosure.

Referring to FIG. 3, FIG. 3 is a schematic view showing a projection method according to an embodiment of the disclosure. The projection method shown in FIG. 3 may be executed by the projection system 1 shown in FIG. 1 and may be operated via the multimedia interface I1 shown in FIG. 2. Therefore, reference may be made to FIG. 1 to FIG. 3 at the same time.

In an embodiment, the image interface APP1 in the multimedia interface I1 may correspond to the image data from the streaming device 30. Since the streaming device 30 is electrically connected to the projection device 10 via the first image input port P1, the image interface APP1 in the multimedia interface I1 may also correspond to the image data transmitted via the first image input port P1. In a further embodiment, the image interface APP1 in the multimedia interface I1 may correspond to the image data from the image source 40. In other words, the image interface APP2 in the multimedia interface I1 may also correspond to the image data transmitted via the second image input port P2.

In step S31, the control device 20 transmits a first command signal to the streaming device 30, and through the communicative connection (e.g., the first image input port P1) between the streaming device 30 and the projection device 10, the image processing circuit 101 of the projection device 10 may further transmit a first control signal to the processor 100, so that the projection device 10 projects the image data from the streaming device 30.

In this embodiment, the streaming device 30 controls the projection device 10. Specifically, according to the first control signal, the processor 100 may set the streaming device 30 as a master device and set the projection device 10 as a slave device. In other words, in that case, the image data projected or displayed by the projection device 10 is controlled by the streaming device 30, and the user can switch the image source of the projection device 10 by using the streaming device 30.

In step S32, the control device 20 transmits a second command signal to the streaming device 30, and through the communicative connection (e.g., the first image input port P1) between the streaming device 30 and the projection device 10 and the communicative connection (e.g., the second image input port P2) between the image source 40 and the projection device 10, the image processing circuit 101 of the projection device 10 may further transmit a second control signal to the processor 100, so that the image input terminal of the projection device 10 is switched from the first image input port P1 to the second image input port P2 to have the projection device 10 project the image data from the image source 40.

In an embodiment, when the projection device 10 is projecting the image data provided by the image source 40, similarly, the user may transmit the first command signal to the streaming device 30 through the control device 20, so that the image input terminal of the projection device 10 is switched from the second image input port P2 to the first image input port P1 to have the projection device 10 project the image data from the streaming device 30.

In summary of the above, the user can use the control device to control the image source of the projection device through the streaming device, so that the projection device can be switched between different image input ports to receive different image data for projection or display. With the projection system and the projection method of the embodiments of the disclosure, the user can use the control device to control the streaming device and the projection device, and the pairing processes between the control device and the projection device and between the control device and the streaming device can be omitted. The projection system and the projection method of the embodiments of the disclosure can provide the user with more convenient operation environment and operation interface to thereby effectively improve the operation convenience for the user.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection system comprising a projection device, a streaming device, and a control device, wherein
    the projection device comprises a first image input port and a second image input port,
    the streaming device is electrically connected to the first image input port of the projection device and is coupled to the projection device in a detachable manner, and
    the control device is a remote controller and comprises a Bluetooth communication interface and an infrared radiation communication interface,
    wherein the control device is configured to transmit a first command signal to the streaming device via the Bluetooth communication interface, so that the projection device projects image data from the streaming device, and
    wherein the streaming device is configured to receive a second command signal from the control device, and the streaming device is configured to control the projection device to switch an image source of the projection device from the first image input port of the projection device to the second image input port of the projection device based on the second command signal.

2. The projection system according to claim 1, wherein the projection device comprises:
    an image processing circuit connected to the first image input port and the second image input port; and
    a processor coupled to the image processing circuit,
    wherein the streaming device transmits a first control signal to the processor via the image processing circuit to set the streaming device as a master device and set the projection device as a slave device.

3. The projection system according to claim 1, wherein the projection device further comprises a power circuit, and the power circuit supplies power to the streaming device.

4. The projection system according to claim 1, wherein when the streaming device receives the second command signal from the control device, the streaming device is configured to control the projection device so that the projection device projects image data transmitted via the second image input port.

5. The projection system according to claim 1, wherein the projection device displays a multimedia interface, and the multimedia interface comprises a first image interface corresponding to the first image input port and a second image interface corresponding to the second image input port.

6. The projection system according to claim 5, wherein the multimedia interface is displayed and controlled through Consumer Electronics Control or Digital Display Channel.

7. A projection method, executed by a projection system, the projection system comprising a projection device, a streaming device, and a control device, wherein the control device is a remote controller and comprises a Bluetooth communication interface and an infrared radiation communication interface, and wherein the projection method comprises:
    transmitting, by the control device, a first command signal to the streaming device via the Bluetooth communication interface, so that the projection device projects image data from the streaming device, wherein the projection device comprises a first image input port and a second image input port, the streaming device is electrically connected to the first image input port of the projection device; and
    transmitting, by the control device, a second command signal to the streaming device, so that the projection device switches an image source of the projection device from the first image input port of the projection device to the second image input port of the projection device based on the second command signal.

8. The projection method according to claim 7, wherein the projection device comprises an image processing circuit connected to the first image input port and the second image input port, and a processor coupled to the image processing circuit, wherein the projection method further comprises: transmitting, by the streaming device and the image processing circuit, a first control signal to the processor to set the streaming device as a master device and set the projection device as a slave device.

9. The projection method according to claim 7, wherein the projection device further comprises a power circuit which supplies power to the streaming device.

10. The projection method according to claim 7, further comprising:
    displaying a multimedia interface by the projection device, wherein the multimedia interface comprises a first image interface corresponding to the first image input port and a second image interface corresponding to the second image input port.

11. The projection method according to claim 10, wherein the multimedia interface is displayed and controlled through Consumer Electronics Control or Digital Display Channel.

* * * * *